Jan. 17, 1961 W. STASKOWSKI 2,968,781
ELECTRICAL DISTRIBUTION SYSTEM
Filed June 4, 1956 2 Sheets-Sheet 1

INVENTOR.
Walter Staskowski
BY Cullen and Canton
Attorneys

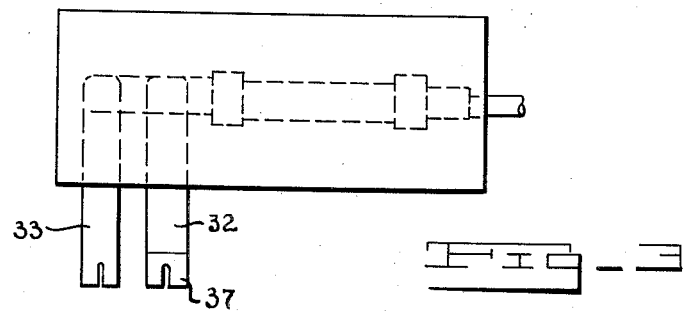
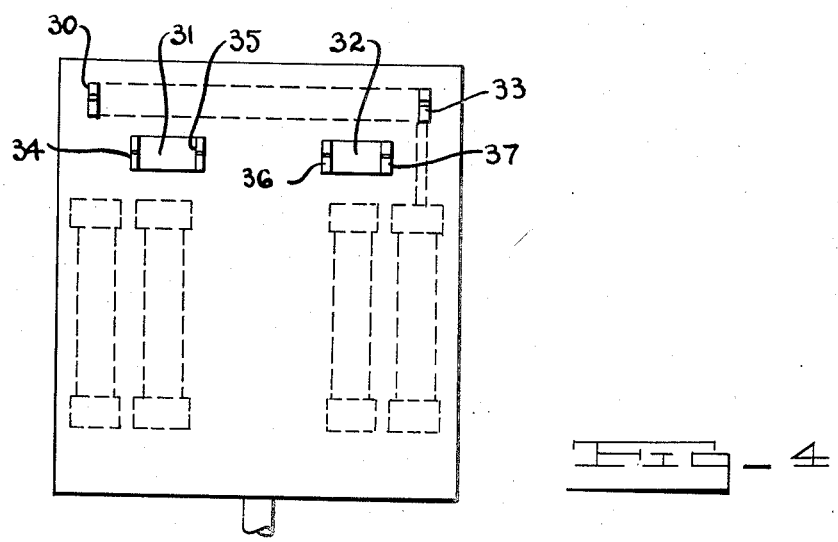

United States Patent Office 2,968,781
Patented Jan. 17, 1961

2,968,781

ELECTRICAL DISTRIBUTION SYSTEM

Walter Staskowski, 19197 Sherwood Ave., Detroit, Mich.

Filed June 4, 1956, Ser. No. 589,139

2 Claims. (Cl. 339—22)

This application relates to electrical distribution systems and particularly to systems that are generally referred to in the industry as plug in bus bar systems.

Before proceeding with a description of the system hereof, reference is made to certain patents of the prior art to aid in orienting the reader into the art under consideration.

United States Patent No. 2,251,403 of 1941, shows an electrical distribution system of the plug in bus bar or bus duct type having six bars arranged in three phases, namely AA'—BB'—CC', enclosed within a duct and with which connection is established by means of a plug in connector having three prongs which engage facing faces of the bus bars, each prong engaging between the two bars that are laminated to form one leg of a three phase system. In the above device the six bars are arranged with their faces parallel and with six edges facing toward one side of the group of bars and the other six edges facing toward the other side of the group of bars.

United States Patent No. 2,287,502 of June 23, 1942, shows a bus duct system comprising six bars arranged in three pairs and connected to three legs of a three phase system and arranged in the following order:

A  B  C'
C  A' B' with the intrapair spacing being less than the interpair spacing for somewhat reducing the impedance of the system as well as maintaining a degree of accessibility of the bus bars for end to end connection. In this device the six bars are arranged in two rows, one above the other, each row comprising three bars, with each bar in a row having its edges facing the edges of the neighboring bars.

It is also recognized as old to arrange the six bars thus: AB—CA'—B'C', the physical arrangement being according to Patent No. 2,251,403 but the electrical arrangement being according to Patent No. 2,287,502.

United States Patent No. 2,262,067 of November 11, 1941, shows in Fig. 6 a plug in bus bar system comprising three bars arranged side by side in a very close spacing ABC, one bar per leg of a three phase system, with connector prongs engaging the faces of the bars in the following manner. Prong 1 engages the outer face of bar A. Prong 2 is split to engage both faces of bar B. Prong 3 engages the outer face of bar C.

The purpose of the present invention is to provide a plug in bus bar system comprising six bars which are physically arranged generally like the physical arrangement of the six bars of Patent No. 2,251,403, which are electrically engaged by prongs of plug in devices on the faces of the bus bars generally according to the arrangement shown in Patent No. 2,251,403 and also as suggested by Fig. 6 of Patent No. 2,262,067, but with the bars electrically connected in what has come to be known as the paired phase arrangement suggested by Patent No. 2,287,502 in an arrangement AB—B'C—C'A', with the prongs of the plug in connectors being suitably arranged and connected as follows: Prong 1 engages the outer face of the first bar A. Prong 2 is split so as to straddle the wide space between bars B and B' and engage the facing faces of bars B and B'. Prong 3 is split in the same way to straddle the wide space between bars C and C' engaging the facing faces of bars C and C'. Prong 4 engages the outer face of bar A'. Within the connector, cross-connection is established so that prongs 1 and 4 which engage bars A and A' are interconnected.

With this purpose in mind there has been developed the system shown in the appended drawings.

In these drawings:

Figs. 3 and 4 are side and bottom plan views of the connecter, per se, of Fig. 2.

Inasmuch as the details of the bus duct and many of the details of the plug in connector are old and well-known in the art and their form and provision will readily be apparent to those skilled in the art, no effort will be made here to disclose or describe such details of construction but the description will be confined to just what is necessary to disclose diagrammatically the systems defined in the claims found at the end of this specification.

Figure 1:
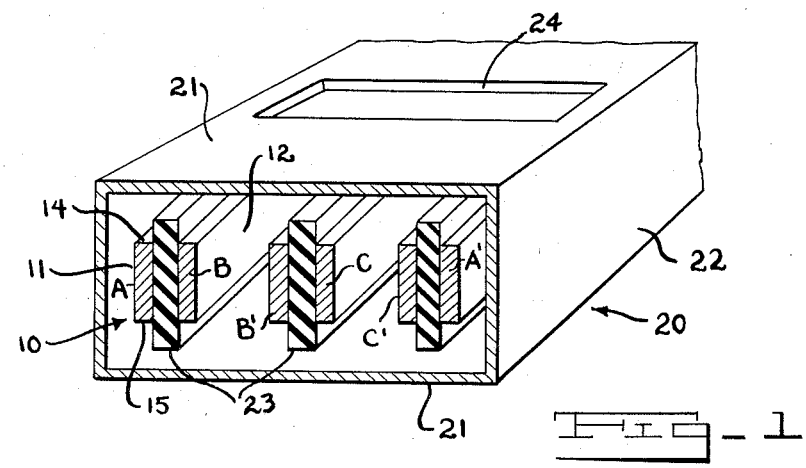
Fig. 1 is a drawn back transverse section view of a group of bus bars shown enclosed within a duct diagrammatically disclosed.
Figure 2:
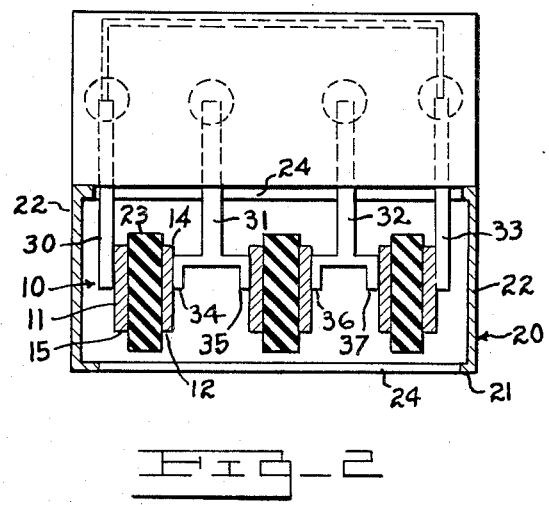
Fig. 2 is an end view of a connector having four prongs shown in place on a bus duct of Fig. 1.

Fig. 1 shows an electrical distribution system comprising a group of six bus bars 10. Each bar is a wide, thin strap having faces 11 and 12 and having edges 14 and 15. The six bars are arranged in a group with their faces parallel and with six edges 14 exposed towards one side of the group and with the six edges 15 exposed towards the opposite side of the group.

The bus bars are enclosed, in a manner and for purposes well known to the art, in a sheet metal housing 20 having sides 21 and edges 22. Between the bars of a pair are insulation sheets 23, as shown.

At suitable places along the run of the duct are disposed plug in connectors for branch circuit connection. The form, general arrangement, details, mounting means, etc., of these connectors are old and well-known. The only novel feature of these connectors is first that each has four contactors or prongs numbered 30, 31, 32 and 33. Prongs 30 and 33 are cross-connected within the connector to be interconnected. Prongs 31 and 32 are forked to provide tines 34, 35, 36 and 37 respectively.

At suitable points along the run of the duct on sides 21 of the duct are formed openings 24 well-known in the art for permitting the prongs 30-33 inclusive to enter the duct and engage the faces of the bus bars 10 in accordance with the following code.

Prong 30 will engage the outer face 11 of the first bar. Prong 31 through its forks 34 and 35 will engage the facing faces of the second and third bars, straddling the wide space between them. Prong 32 through its forks 36 and 37 will engage the facing faces of the fourth and fifth bars, straddling the wide space between them. Prong 33 will engage the outer face of the sixth bar.

The group of six bars are connected in phases as follows. The first and sixth bars will be connected to phase A and will be referred to as bars A and A'. The second and third bars will be connected to phase B and will be referred to as bars B and B'. The fourth and fifth bars will be connected to the third leg of the three phase system and will be referred to as bars C and C'.

It will be observed that the spacings A—B, B'—C, C'—A' are very small, considerably less than the spacings B—B' and C—C'.

Now having described the electrical distribution system hereof, reference will be had to the claims which follow.

I claim:

1. In an electrical distribution system of the plug in bus bar type, a group of six bus bars, each bar being a wide, thin strap, the six bars being arranged with their faces parallel and with six edges exposed towards one side of the group and the other six edges exposed towards the opposite side of the group, and a plug connector having four contactors, the first contactor engaging a face of the first bus bar, the second contactor engaging faces of the second and third bus bars, the third contactor engaging faces of the fourth and fifth bus bars, and the fourth contactor engaging a face of the sixth bus bar, the first and fourth contactors being interconnected inside the connector with the construction being one wherein the faces of the bus bars that are engaged are the outer faces of the first and sixth bus bars and the facing faces of the second and third, and fourth and fifth bars respectively, the construction including means connecting the first and sixth bus bars to one leg of a three phase system, and the second and third bus bars to a second leg of a three phase system, and the fourth and fifth bus bars to a third leg of a three phase system, with the spacing between the second and third bars, and the fourth and fifth bars, being greater than that between the first and second, third and fourth, and fifth and sixth bars respectively.

2. In an electrical distribution system of the plug in bus bar type, a group of six bus bars, each bar being a wide, thin strap, the six bars being arranged with their faces parallel and a plug connector having four contactors, the first contactor engaging a face of the first bus bar, the second contactor engaging faces of the second and third bus bars, the third contactor engaging faces of the fourth and fifth bus bars, and the fourth contactor engaging a face of the sixth bus bar, the first and fourth contactors being interconnected inside the connector with the construction being one wherein the faces of the bus bars that are engaged are the outer faces of the first and sixth bus bars and the facing faces of the second and third, and fourth and fifth bars respectively, the construction including means connecting the first and sixth bus bars to one leg of a three phase system, and the second and third bus bars to a second leg of a three phase system, and the fourth and fifth bus bars to a third leg of a three phase system, with the spacing between the second and third bars, and the fourth and fifth bars, being greater than that between the first and second, third and fourth, and fifth and sixth bars respectively.

References Cited in the file of this patent

UNITED STATES PATENTS

| | | |
|---|---|---|
| 551,930 | Greene | Dec. 24, 1895 |
| 1,369,680 | Lundquist | Feb. 22, 1921 |
| 2,251,403 | Frank et al. | Aug. 5, 1941 |
| 2,262,067 | Togesen et al. | Nov. 11, 1941 |
| 2,287,502 | Togesen et al. | June 23, 1942 |
| 2,288,078 | Fisher et al. | June 30, 1942 |
| 2,365,514 | Bosch | Dec. 19, 1944 |
| 2,386,177 | Andersen | Oct. 9, 1945 |
| 2,439,956 | Wagner et al. | Apr. 20, 1948 |
| 2,482,310 | Adam | Sept. 20, 1949 |
| 2,738,446 | Fleming | Mar. 13, 1956 |